J. E. DUKELOW.
CHAIN BELT.
APPLICATION FILED SEPT. 20, 1911.
1,203,317. Patented Oct. 31, 1916.
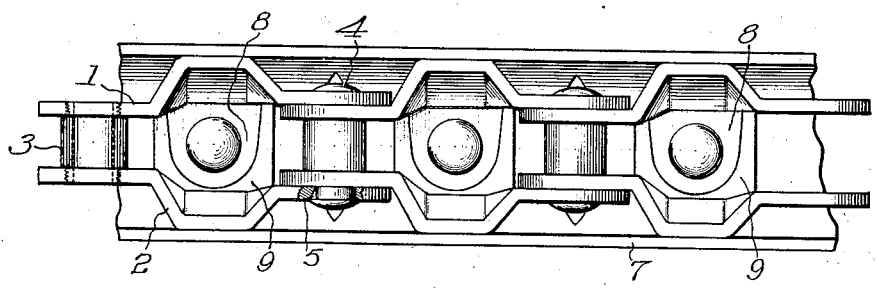
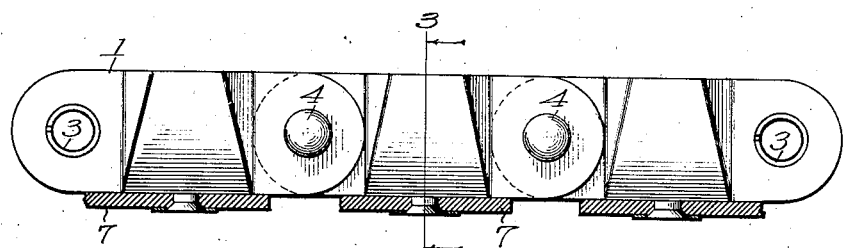
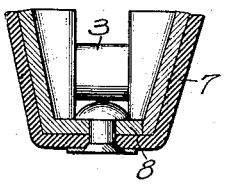
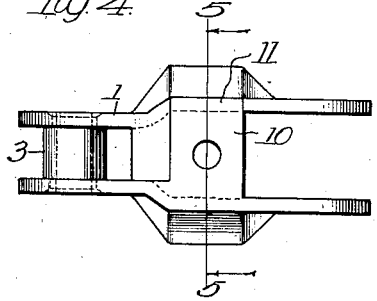
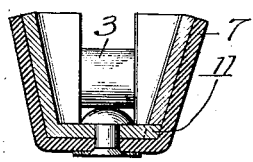
Witnesses:
Robert H. Weir
Blanche Chalmers
Inventor:
John E. Dukelow
By Burton
Atty.

UNITED STATES PATENT OFFICE.

JOHN E. DUKELOW, OF CHICAGO, ILLINOIS.

CHAIN BELT.

1,203,317. Specification of Letters Patent. Patented Oct. 31, 1916.

Application filed September 20, 1911. Serial No. 650,393.

*To all whom it may concern:*

Be it known that I, JOHN E. DUKELOW, a citizen of the United States, residing at Chicago, in the county of Cook and State of Illinois, have invented certain new and useful Improvements in Chain Belts, of which the following is a description.

My invention relates to means adapted to coöperate with the groove of suitably formed sheaves to transmit power from one rotatable member to another.

The object of my invention is to produce a simple, durable, reliable and efficient device of the kind described adapted to transmit power with the slightest possible loss and with little or no slippage between the members.

To this end my invention consists in the novel construction, arrangement and combination of parts herein shown and described and more particularly pointed out in the claims.

In the accompanying drawings wherein like or similar reference characters indicate like or corresponding parts: Figure 1 is a plan view of my improved driving chain. Fig. 2 is a side elevation of the same with the pad or cushion removed to more clearly show the construction. Fig. 3 is a section taken substantially on line 3—3 of Fig. 2. Fig. 4 is a bottom plan view of a slightly modified form of my device. Fig. 5 is a section taken substantially on line 5—5 of Fig. 4.

In the preferred form shown, my invention consists of a plurality of metal links each comprising two similar side bars 1 and 2 connected near one end by a tubular rivet 3 or equivalent means arranged to rigidly connect the side bars and afford a suitable bearing for the rivet or pin 4 connecting the links. In the preferred construction both ends of each side bar are so formed that when assembled to form the link the ends of the bars are substantially parallel, while the central portion is bent outward laterally to conform to the angle of the groove in the sheave with which the chain is intended to coöperate.

In the form shown the central portion of each side bar is formed to provide a smooth flat bearing surface of as great an area as possible to bear against the walls of the sheave groove and the connected ends of the bars are arranged to enter and snugly fit between the free ends of the bars of the next adjacent link, the rivets or pins 4 are preferably so formed that when in position a part 5 at the head of each pin is adapted to engage a corresponding part upon the link to prevent rotation between the pin and link thereby confining the bearing surface or the movable surfaces between the links to the bearing provided between the interior of sleeve 3 and pin 4. Any suitable means may be provided for rigidly securing the sleeve 3 in position, in the form shown in Fig. 1 the extremities of each of the sleeves 3 are slightly reduced in diameter and suitable threads are cut upon the reduced portion adapted to engage and coöperate with similar threads formed in the openings in the ends of the bars. In the form shown in Fig. 4 the extremity of the part 3 is reduced as before and the opening through the end of the link is formed to tightly fit the reduced portion and countersunk slightly from the outside so that the extreme end of the reduced portion may be expanded or riveted over to fill the countersunk portion of the bar. In either case the object is to provide a conveniently removable connection between the side bars, adapted to serve as a bearing upon the pin connecting the adjacent links and so arranged that substantially all wear between the links will occur in this bearing and the coöperating portion of the pin 4, both of which, if desired may be readily replaced thereby renewing the bearing and eliminating the effects of use.

In the preferred construction shown a pad or cushion 7 is provided adapted to inclose the bottom and bearing portions of each link to provide a resilient friction surface to engage the walls of the sheave grooves. Any suitable material may be employed for this purpose such as rawhide, canvas or the like, preferably attached to some portion of the link to avoid contact between the fastenings and the sheave. In the preferred construction I provide a lateral extension 8 upon the lower edge of each side bar 1 extending toward the side bar 2 adapted to receive the rivet or other convenient fastening means. In the form shown a part 9 is provided upon the side bar 2 positioned in the same plane and adapted to engage the free end of the part 8 to assist in spacing and otherwise rigidly connecting the bars 2. In the form shown in Fig. 4 the part 10 extends entirely across the space between the bars and engages a notch 11 formed in the opposite bar. In either case the object is the same, to provide a part rigidly connected to one of the side bars adapted to receive the fastening between the cushion 7 and the link to hold the same securely in position.

Having thus described my improvement it is obvious that various immaterial modifications may be made in my device without departing from the spirit of my invention, hence I do not wish to be understood as limiting myself to the exact form or construction shown.

What I claim as new and desire to secure by Letters Patent is:

1. In a device of the kind described, a plurality of similar, connected links each comprising a pair of separately formed side bars suitably spaced from each other and means rigidly connecting said bars at one end, said bars having a part positioned therebetween rigidly attached to one only thereof, with the ends of said bars projecting beyond said part, a cushion and means for attaching said cushion to said part.

2. In a device of the kind described, a plurality of similar, connected links each comprising a pair of separately formed side bars rigidly connected at one end and suitably spaced and laterally divergent from each other, one of said bars having a part positioned between said bars rigidly attached at one end to said side bar intermediate its ends, the opposite end being substantially free and coöperating with means upon the opposite side bar to assist in retaining said bars in position, the ends of each bar projecting beyond said part, in combination with a cushion, and means for attaching said cushion to said part.

3. In a device of the kind described, a plurality of similar, connected links each comprising a pair of separately formed side bars, a tubular part positioned between the ends of said bars to suitably space the bars from each other, one of said bars having a part positioned between the proximate edges of the bars and rigidly attached at one end to one thereof, the opposite end being substantially free, the ends of each bar projecting beyond said part, in combination with a cushion, and means for attaching said cushion to said part.

4. In a device of the kind described, a plurality of similar, connected links each comprising a pair of separately formed side bars suitably spaced from each other, a tubular sleeve connecting said bars at one end, the ends of said side bars being substantially parallel, one of said bars having a laterally extended part positioned between said bars, the end of said part being substantially free, and the ends of each bar projecting beyond said part, in combination with a cushion, and means for attaching said cushion to said part.

5. In a device of the kind described, a plurality of similar, connected links each comprising a pair of separately formed side bars suitably spaced from each other, means rigidly connecting said bars at one end, said bars having a part positioned therebetween and rigidly attached to one only thereof with the ends of said bars projecting beyond said part.

6. In a device of the kind described, a plurality of similar, connected links each comprising a pair of separately formed side bars suitably spaced from each other, one of said bars having a part positioned between said bars and rigidly attached at one end thereto, the opposite end being substantially free, the opposite bar having means adapted to loosely engage the free end of said part, the ends of each bar projecting beyond said part.

7. In a device of the kind described, a link comprising a pair of separately formed side bars suitably spaced and laterally divergent from each other, one of said bars having a laterally extended part positioned between the proximate edges of said bars, the opposite end being substantially free and the ends of each bar projecting beyond said part and a tubular sleeve rigidly connecting one end of said bars together.

8. In a device of the kind described, a plurality of similar, connected links, each comprising a pair of separately formed side bars connected at one end and suitably spaced and laterally divergent from each other, the ends of said side bars being substantially parallel and one of said bars having a laterally projecting part positioned between their proximate edges, the end of said part being substantially free, and the ends of each side bar projecting beyond said part.

9. In a device of the kind described, a link comprising a pair of suitable separately formed side bars suitably spaced and laterally divergent from each other, the ends of said side bars being substantially parallel, one of said bars having a lateraly projecting part positioned between their proximate edges, the end of said part being substantially free, and the ends of each side bar projecting beyond said part.

10. In a device of the kind described, a plurality of similar, connected links each comprising a pair of separable side bars connected at one end and suitably spaced and laterally divergent from each other, the ends of said side bars being substantially parallel, one of said bars having a laterally projecting part positioned between their proximate edges with one end free and engaging a part upon the opposite bar, and the ends of each bar projecting beyond said part.

11. In a device of the kind described, a plurality of similar, connected links each comprising a pair of side bars suitably spaced from each other, a tubular part rigidly connecting said bars at one end, and one of said bars having a laterally projecting part positioned between said bars with its opposite end substantially free, means upon the opposite bar loosely engaging the free end of said part, the ends of each bar projecting beyond said part.

In testimony whereof, I have hereunto signed my name in the presence of two subscribing witnesses.

JOHN E. DUKELOW.

Witnesses:
   BURTON U. HILLS,
   BLANCHE CHALMERS.